(12) United States Patent
Loftus

(10) Patent No.: US 7,286,524 B1
(45) Date of Patent: Oct. 23, 2007

(54) SYSTEM AND METHOD FOR HIGH CAPACITY/FAILURE TOLERANCE TELECOMMUNICATIONS IN A SIGNALING NETWORK GATEWAY

(75) Inventor: Ronald J. Loftus, Louisville, CO (US)

(73) Assignee: Qwest Communications International, Inc., Denver, CO (US)

( * ) Notice: Subject to any disclaimer, the term of this patent is extended or adjusted under 35 U.S.C. 154(b) by 682 days.

(21) Appl. No.: 09/776,163

(22) Filed: Feb. 2, 2001

(51) Int. Cl.
*H04J 3/22* (2006.01)

(52) U.S. Cl. .................................... 370/354; 370/467

(58) Field of Classification Search ............. 370/352, 370/353, 354, 356, 465, 466, 467
See application file for complete search history.

(56) References Cited

U.S. PATENT DOCUMENTS

| | | | | |
|---|---|---|---|---|
| 5,475,732 A * | 12/1995 | Pester, III | ............... | 379/32.01 |
| 5,857,142 A | 1/1999 | Lin et al. | ............... | 455/5.1 |
| 5,870,565 A | 2/1999 | Glithio | ............... | 395/200 |
| 5,926,482 A | 7/1999 | Christie et al. | ............ | 370/469 |
| 5,966,431 A | 10/1999 | Reiman et al. | ............ | 379/115 |
| 6,028,914 A | 2/2000 | Lin et al. | ............... | 379/14 |
| 6,064,653 A * | 5/2000 | Farris | ............... | 370/237 |
| 6,069,890 A * | 5/2000 | White et al. | ............... | 370/352 |
| 6,075,783 A | 6/2000 | Voit | ............... | 370/352 |
| 6,081,591 A | 6/2000 | Skoog | ............... | 379/230 |
| 6,084,892 A | 7/2000 | Benash et al. | ............ | 370/701 |
| 6,122,255 A * | 9/2000 | Bartholomew et al. | ...... | 370/237 |
| 6,134,235 A * | 10/2000 | Goldman et al. | ......... | 370/352 |
| 6,154,445 A * | 11/2000 | Farris et al. | ............... | 370/237 |
| 6,418,205 B2 * | 7/2002 | Capers et al. | ......... | 379/112.01 |
| 6,434,140 B1 * | 8/2002 | Barany et al. | ............ | 370/352 |
| 6,590,885 B1 * | 7/2003 | Jorgensen | ............... | 370/338 |
| 6,647,108 B1 * | 11/2003 | Wurster et al. | ......... | 379/215.01 |
| 6,657,975 B1 * | 12/2003 | Baxley et al. | ............ | 370/260 |
| 6,798,771 B1 * | 9/2004 | Low et al. | ............... | 370/353 |
| 6,823,061 B2 * | 11/2004 | Prasad et al. | ............ | 379/230 |
| 6,842,447 B1 * | 1/2005 | Cannon | ............... | 370/352 |

FOREIGN PATENT DOCUMENTS

WO WO9847275 A2 * 10/1998
WO WO9949636 A1 * 9/1999

OTHER PUBLICATIONS

Hamalainen, J. et al., "Connection-less Packet Data Transmission in the Signalling Network Infrastructure," Third Annual International Conference on Universal Personal Communications. Sep. 27-Oct. 1, 1994. pp. 511-515.*
SS7 at Webopedia, www.webopedia.com, Oct. 30, 2000.

* cited by examiner

*Primary Examiner*—Wellington Chin
*Assistant Examiner*—Donald L Mills
(74) *Attorney, Agent, or Firm*—Robert G Crouch; Gregory T. Fettig; Marsh Fischmann & Breyfogle

(57) ABSTRACT

A telepathy system provides for the transport of voice communication over a data centric network. Through use of the SS7 signaling network, an additional STP pair may be located between STP pairs in the SS7 network and a switch specially configured for converting voice information to data packets. With the addition of a layer of STP pairs, additional processing may be performed at this layer and a significant number of A-links may be eliminated such that the majority of communication between the SS7 network and the switch may be performed over high speed B-links.

12 Claims, 3 Drawing Sheets

SYSTEM AND METHOD FOR HIGH CAPACITY/FAILURE TOLERANCE TELECOMMUNICATIONS IN A SIGNALING NETWORK GATEWAY

FIELD OF THE INVENTION

The invention described herein relates to the processing of SS7 signals and more particularly to a system and method for processing SS7 signals in conjunction with the transmission of voice data over a data centric network.

BACKGROUND OF THE INVENTION

Currently, the public switched telephone network (PSTN) is employable to transport voice and data traffic between two locations. As the traffic on the PSTNs has increased, alternatives have been sought for transporting voice data between caller locations. As such, new voice-over-packet (or cell) network architectures are being considered for public telecommunications networks that will require large scale signaling gateways to connect data centric networks to the existing circuit switch network infrastructure. To provide for the voice-to-packet conversion various types of media gateways are distributed along the edges of the PSTN and a packet based network. The media gateways may be controlled by a number of call/media control computers at one or more centralized locations.

Specifically, these call/media computers may be employed to provide class 4 and class 5 voice switching services via protocols that control various types of media gateways. The call/media control computers centrally act as service switching points (SSP) wherein command signals for transmitting the voice data from one location to another is received via the SS7 messaging network. As is well known, common channel signaling networks, such as the SS7 signaling networks use dedicated channels to pass digital messages between systems for call set-up, call control, call routing and other functions. These dedicated signaling channels are part of a network that is separate from the network that carries the actual voice and data signals. SS7 network is a separate switching system which is used for voice or data calls. The SS7 network is used to route control information wherein whenever two switches or elements have to pass call control information during or prior to a phone call they pass as data via the SS7 signaling network.

There are three basic types of network node elements in a SS7 network. One of them is the SSP, which may be a central office switch or a tandem switch. The second principal node element is the service control point (SCP). An SCP acts as a database query server for the rest of the network. For example, an SCP may be used in such applications as translating ported telephone numbers, routing 800 calls, tracking roamers in a cellular network, and alternate billing service/line indication database services which provide operator type services. The third principal node element is the signal transfer point (STP). An STP is essentially a packet switch that routes the messages from SSPs and SCPs to SSPs and SCPs. The topology of the network is such that STPs are typically employed in a related pair configuration at geographically separate locations. In connection with a mated pair of STPs will be a designated set of SSPs and SCPs.

SUMMARY OF THE INVENTION

The applicant has recognized that in existing signaling network gateway designs, the point of attachment commonly uses SS7/C7 A-links to connect to the existing STP mated pairs in the SS7 network with the call/media computers which act as SSP's in the signaling network architecture. Due to the scale of call volume typically carried by the data centric network, a large number of A-links will be required for this type of configuration. As such, the inventor has recognized that a processing interface may be introduced between the STPs of the SS7 network and the call/media controls computer for reducing the load on the STP pair in the SS7 network thus providing a fault tolerant structure for the media gateway.

Described herein is a system and method for providing additional processing capability in a telephony network which performs voice to data and data to voice processing. According to the system described herein, media gateways may be provided at the edges of a public switch telephone network (PSTN) such that voice telephone which originate within the PSTN may be converted and transmitted over a data network, converted back to voice calls, and then transmitted to their destination. Controlling the media gateways is a switch device which receives and processes command signals transmitted over a signaling network. The switching device may receive and transmit control messages over the signaling network. According to the invention described herein, an additional pair of processing elements, which in one configuration of the invention may be a matched pair of STPs, may be located between STPs in the signaling network and the switching device. All control signals for voice calls which are to be routed over the data network are routed through the additional processing devices. As such, certain computational functions previously performed by STP pairs in the signaling network and the switching device may be performed at these inserted processing devices.

In one aspect of the invention high speed B-links may be employed to establish connections between the new pair of STPs and the existing pair of STPs in the signaling network. Interconnections between the various STPs may be provided via high speed C-links. The connection between the new STP pair and the switching device may be provided through "logical" A-links which may comprise redundant local area network (LAN) or wide area network (WAN) data communication equipment and methods. In particular, LAN signaling busses may provide interconnections between the new STPs and the call/media computers employed in the switching device for controlling the signal processing at the media gateways.

In another aspect of the invention, the switching device further includes an Internet protocol (IP) switching router which is employable to transfer encapsulated signaling network messages from one site to another. According to the invention described herein, each STP of the new STP pair may be located at first and second geographical locations and each location may include its own IP router and set of call/media control computers. Interconnections between these devices are provided over the packet transport network as well as C-links between the new pair of STPs.

In one configuration of the invention, additional functions which the STP pair may perform includes lower level SS7 protocol processing as well as the encapsulation of SS7 ISUP messages for transfer over an IP network, such that the work load of SS7 protocol processing in the call/media control computers is minimized. This processing allocation leads to improved processing performance for call control. Further, the new STP pair may be employed to create specialized protocol or inter-working functions on these platforms without affecting the existing signaling network. For example, a software application may be configured that consolidates many point codes that exist on call/media control computer into a single virtual point code on the SS7 network.

In operation, when a voice telephone call is placed from a telephone connection to the PSTN, it is initially routed to a designated SSP. According to the use of an advanced intelligent network (AIN) for which the signaling network is employed, routing information may be retrieved from SCP for the particular call. If it is determined that the call is to be transported over a data network, an interim point code may be retrieved from the SCP which provides for the routing to an SSP associated with the media gateway.

In conjunction with the routing of the telephone call to the media gateway, control signals are transported over the SS7 network to the switching device, such that the routing of the telephone call within the data network may be controlled. As part of that routing, the matched STP pair associated with the switching device will route the call processing signals through a new STP pair to the call/media computers. As was described above, instead of having to provide the A-link connection between the STP pair in the SS7 network and the call/media control computers, this information may be transported over the high speed B-link established between the STP pair in the SS7 signaling network and the new STP pair. The new STP pair will provide the signals to the call/media control computers and the transport over the data network of the telephone call will be controlled therein.

On the other side of the data network, another media gateway will receive the data message and in response to control signals received from the switching device provide for the conversion of the data message to a voice call. At this point the voice call may be transmitted over the PSTN to its destination.

DETAILED DESCRIPTION

Figure 1:
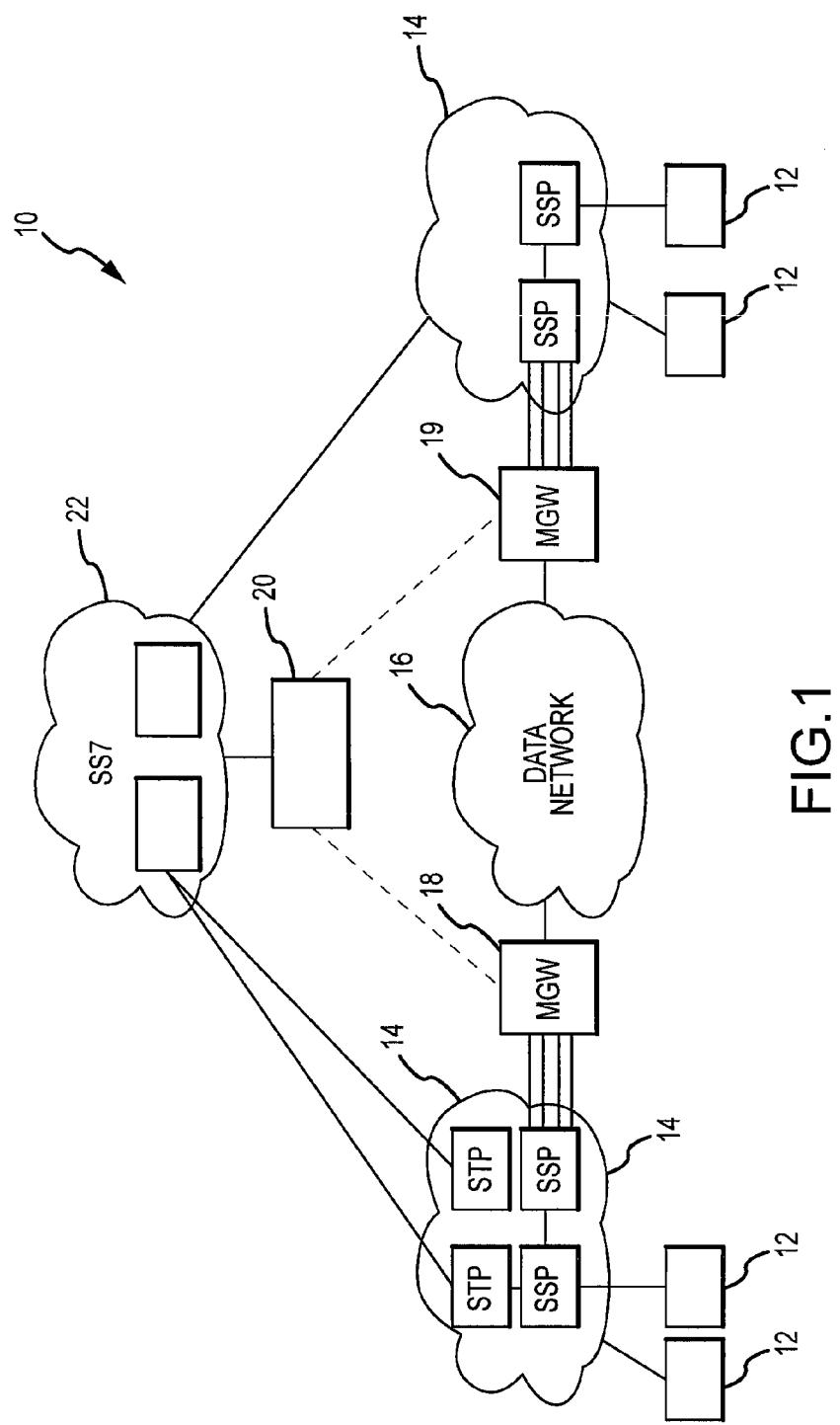
FIG. 1 discloses a system diagram for a telecommunications network within which the system described herein operates.

Disclosed in FIG. 1 is a system diagram for a telecommunications network which incorporates a voice-over-packet network architecture via a media gateway which is turn is connectable to a packet based network. According to the diagram of FIG. 1, voice calls to be transmitted over the telecommunications network 10 originates from callers 12. Callers 12 may comprise parties who wish to make voice telephone call over the telecommunications network or who wish to establish a data connection using computing equipment which employs a modem. A voice call which is placed is done so within telecommunications network 14, which in the present configuration of the invention may comprise the public switch telephone network (PSTN). The system described herein is employable in any type of telecommunications network and may be inter LATA or intra LATA.

Out of band signaling for the telecommunications network 14 is routed through SS7 network 22. As is well known in the art, SS7 networks are a commonly used standard for signaling networks employed in the United States. Although an SS7 network is described herein as the preferred network, one skilled in the art would know that the system and method described herein are employable with other signaling networks.

Located at the "edge" of the telecommunications network 14 are media gateways 18 and 19. The media gateways provide for the conversion of voice and/or packet information for transmission over data network 16. The media gateways also provides for the conversion of data packet information back to voice data for transmission within the telecommunications network 14. In one configuration of the invention, the media gateways are network servers configured with a voice-to-packet card which provides for conversion of data in either direction.

The data network 16 may comprise any number of different types networks which provide for packet based communications. They may include the Internet, frame relay network, etc. . . . . . The voice, data, and/or video data to be transmitted over the data network may be converted to such data communications formats as ATM or TCP/IP.

The media gateways 18 and 19 are controlled from a switching apparatus 20 which in turn is in connection with the SS7 network 22. Included in the switching apparatus 20 may be any number of call/media control computers which are configured to receive and transmit data signals relating to the processing of voice and data information at the media gateways. These media control computer are known as call agents and in the context of the invention described herein may provide class 4 and class 5 switching services. Control signals for directing operations of the media gateway 18 may be transmitted through data network 16.

Figure 2:
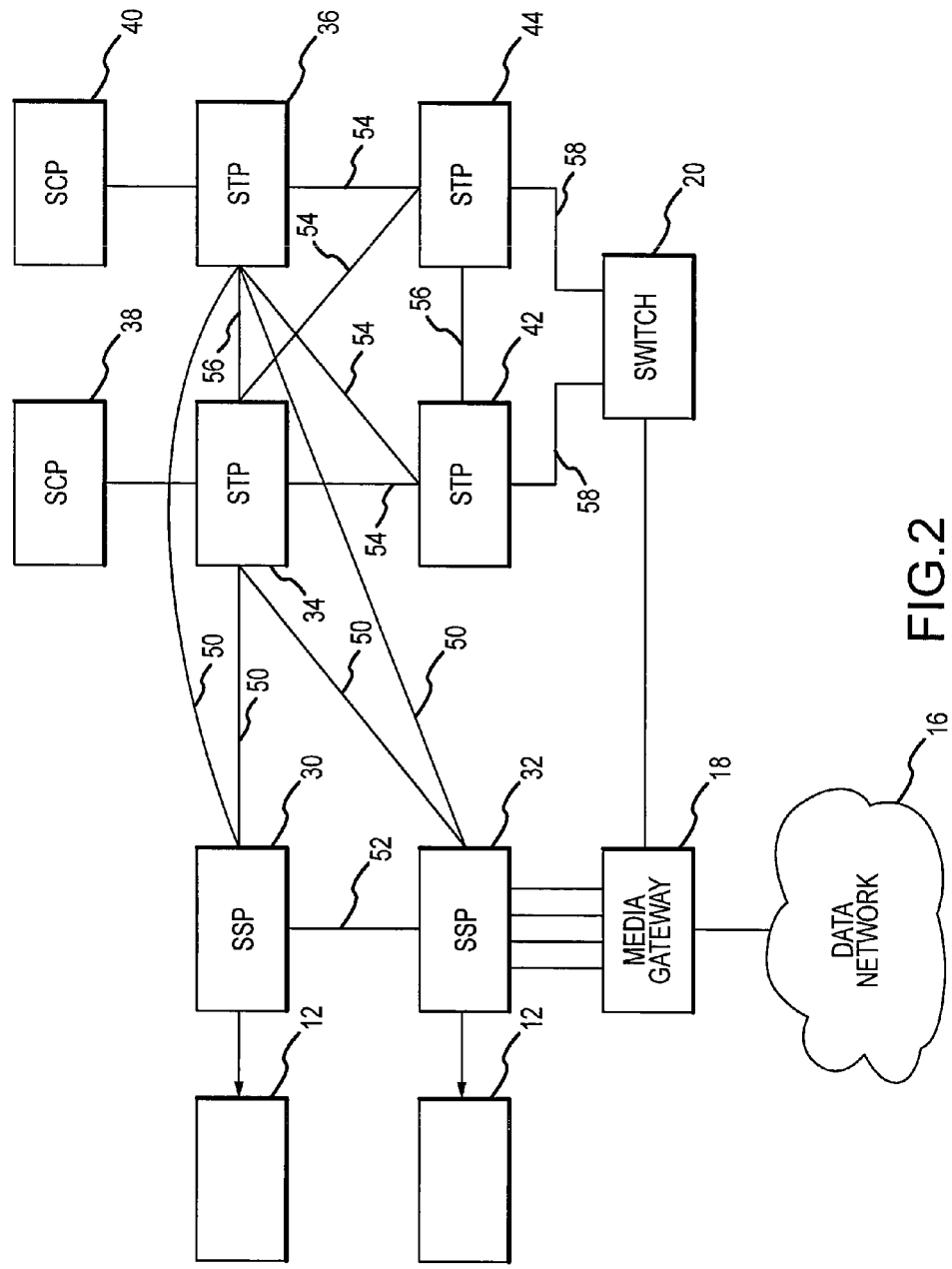
FIG. 2 discloses a system diagram which shows in detail the connections established between the switching points in the telecommunications network.

As is well known, SS7 signaling networks provide a medium for routing out of band signals generated for controlling the routing of telephone calls within a telecommunications network. As was mentioned, above the SS7 network is also employable when transporting voice communications over a packet based network. Disclosed in FIG. 2 is a system diagram which shows in detail the routing of control signals within the SS7 network which in turn provide for the transport of voice communications over the data network 16. As is well known, a PSTN comprises a number of service switching points (SSP) 30 and 32 located at the central offices in the PSTN for establishing connections with parties making telephone calls. The SSPs are switches that originate, terminate or tandem calls. An SSP sends signaling messages to other SSPs to set-up, manage and release voice circuits required to complete a call. Network traffic generated between signal points is routed via a packet switch, i.e., a signal transfer point (STP) 34 and 36. An STP routes each incoming message to an outgoing signal link based on routing information contained in the SS7 message. Each STP acts as a network hub and provides improved utilization of the SS7 network by eliminating the need for direct link between signaling points.

Also in connection with the STPs 34 and 36 are the service control points (SCP) 38 and 40 which acts as a centralized database for supplying routing information for the PSTN. An SSP may send a query message to the SCP to determine how to route a call. The SCP sends a message in response to the originating SSP containing the routing numbers associated with the dialed number. In the situation where the routing of the call may not necessarily be a direct connection, such as when a voice call is routed over a data network, the SCP may contain the necessary information to route the information to a designated SSP where processing for converting and transmitting the call over the data network may begin.

Returning again to the system diagram of FIG. 2, all of the switching points are deployed in mated paired configurations where each switching point may be in separate physical locations to ensure network wide service in the event of an isolated failure. Connections between the signaling points are also provisioned in pairs. Traffic is shared across all links in the link set. If one of the links fails, the signaling traffic is re-routed over another link in the link set. The SS7 protocol employed in the signaling network provides for both error correction and re-transmission capabilities to allow continued service in the event of signaling point or link failures.

The signaling links provided between the various signaling points may be logically organized according to link type relating to their use in the SS7 signaling network. Link 52 between SSPs 30 and 32 is typically one or more voice trunks configured to carry voice signals. Links 50 between SSPs and STPs are typically classified as A-links. SS7 A-links from class 5 circuit switches in the existing telephone network service region are commonly operated at 56 Kbps.

Signals between matched pairs of STPs are typically carried over B-links 54. In the system described herein, B-links may be operated at 1.5 Mbps. Communications between matched pairs of STPs 34 and 36, and 42 and 44, are typically handled over a C-link. Finally, communications between STPs 42 and 44 and switch 20 are provisioned over a logical A-link 58 which may be provided by any number of different types of networks. These networks will be described in greater detail below.

Incorporated into the system described herein are the matched pair of STPs 42 and 44, which are located between STPs 34 and 36 and switch 20. According to the system described herein, connections from STPs 42 and 44 are only made to STPs 34 and 36. In a typical SS7 signaling network, STPs 34 and 36 within the SS7 network may have connections to any number of other mated STP pairs. However, for the purposes of the system described herein, the STPs 42 and 44 are included only for processing of SS7 signals destined for SSP 32 and switch 20.

Typically in a signaling gateway design which provides voice-to-packet capabilities, the point of attachment commonly uses A-links to connect between existing STP mated pairs 34 and 36 and switch 20. The call/media control computer within the switch will act as SSPs in the signaling network architecture. Due to the scale of call volume that will be typically carried by the data central network, a large number of A-links would be required for this application. Provisioning of these links can be costly and time consuming on both ends, because if low speed (56 Kbps) links are used, links pairs have to be provided on the basis of approximately 22 tandem calls per second. Also, separate A-link sets will be needed for every SSP point code that is represented in the voice-over-packet network.

The A-link termination systems on the signaling gateway are constructed from serial link interface cards, SS7 message transfer part (MTP) protocol software and protocol converters. There is no existing standards for constructing these termination systems and with reliability being a major concern, these links have not yet been proven in any large scale public network application. The complexity and number of A-link termination components that are required in a signaling gateway will introduce multiple, undesirable points of failure into a critical network interface.

According to the signaling gateway system described herein, the interface between the switch 20 and the SS7 STP mated pair 34 and 36, may be modified by incorporating a new STP pair 42 and 44 into the gateway as the front end for interconnection to the existing SS7 signaling network. With this configuration, instead of A-links being employed to connect the SS7 network to the SSPs, the system described herein will use high speed SS7 B-links from STP pair 42 and 44 to connect to the existing STP pair 34 and 36 in the signaling network. The signaling connections to the call/media control computer within the switch 20 may be provided by redundant local area network (LAN) and wide area network (WAN) data communications equipment and methods. The STP pair 42 and 44 will supply SS7 signaling messages to the switch over these data communications paths using various SS7 over Internet protocol techniques. In essence, the message exchanges between the STP pairs 42 and 44 and the switch 20 will function as "logical" A-links in the SS7 context. The system described herein provides a common fault tolerant infrastructure to network via call/media control computer within the switch, to interface to the existing SS7 network of the PSTN and connect to the media gateway over the packet network.

Figure 3:
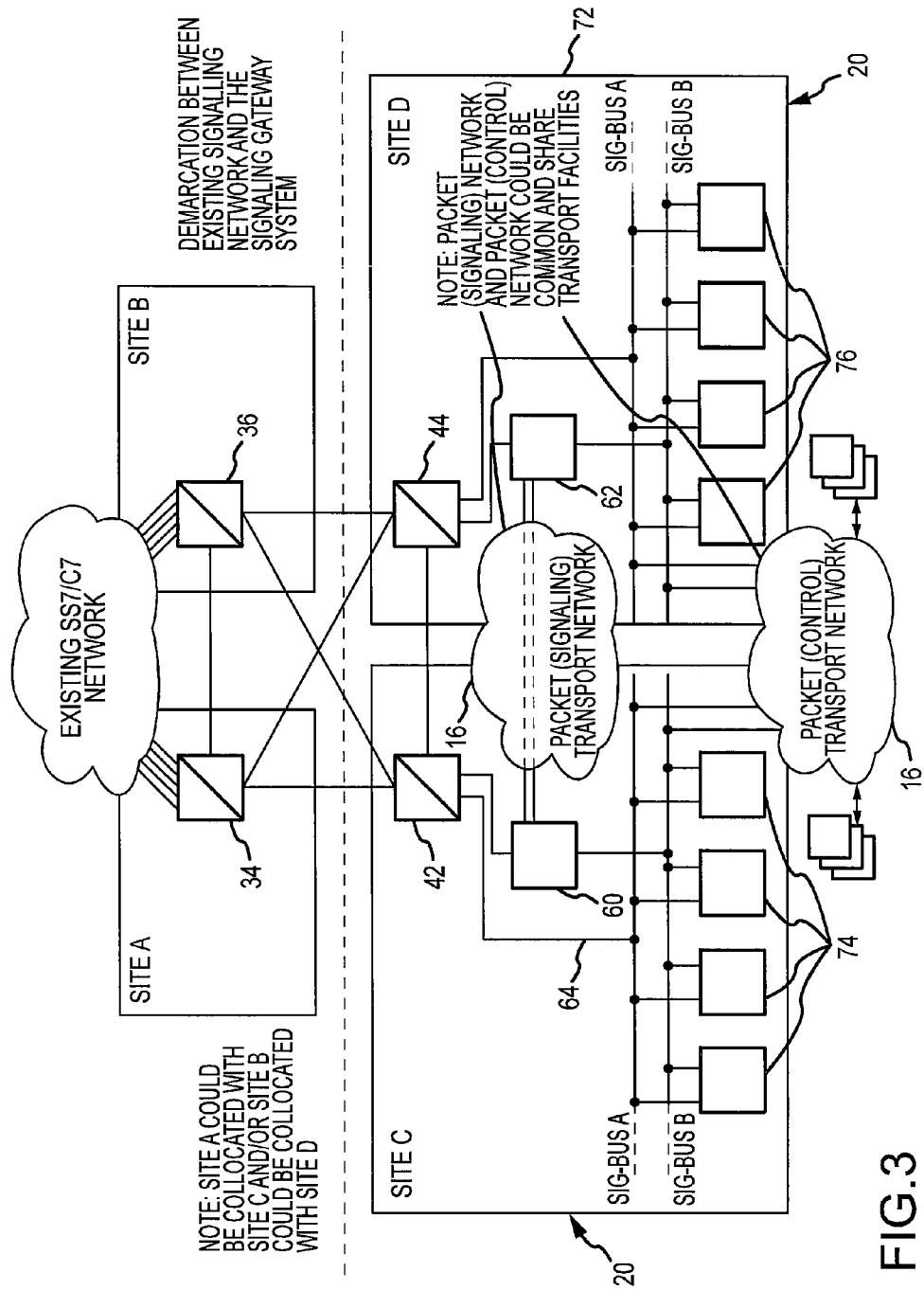
FIG. 3 discloses a detailed system diagram for the switching apparatus for controlling the media gateways.

Disclosed in FIG. 3 is a detailed system diagram for the switch 20 as well as the LAN (and/or WAN) connections established from the components within the switch to STPs 42 and 44. As can be seen, connections are established from STPs 42 and 44 over communications bus 64 and 66, respectfully. One connection established is to high speed IP transport links 60 and 62. These links are packet-on-SONET or ATM interfaces on network routers which will provide high speed transfer of SS7 signaling messages between the matched STPs pairs 42 and 44 as well as the call/media computers. The messages transmitted over the packet transport network are encapsulated in the requisite Internet protocol format. The local area network signaling busses 64 and 66 which operate at 10 Mpbs or 100 Mpbs signaling links perform the equivalent function of A-links between the signaling gateway STP pair 42 and 44, and the call/media control computers 74 and 76.

Network protocols may be per the signaling transports (SIGTRAN) working group of the Internet engineering task force (IETF) which define SS7 message communications over Internet protocols. In connection with the signaling bus are call/media control computers 74 and 76. These computers may be provided from several different suppliers and may perform different functions in the network. These call/media computer provide connection and service control functions for interworking between the data network and an existing PSTN. Two separate computers may work in either an active/standby or low sharing mode at two different sites for fault tolerance and survivability. Dual Ethernet interfaces on these computers interface to the LAN-based SS7 signaling links.

As was discussed above, the call/media control computers 74 and 76 are in communications with the media gateways 18 and 19, respectively. These media gateways are employed to convert voice, data, or video into data communication formats (ATM or IP) for transmission over a packet network. Connections are established and terminated under the control of the call/media control computers via remote protocols such as IETF media gateway control protocol (MGCP).

One aspect of the system which should be noted in particular is that the various components of the SS7 interface may be located at different geographical locations. For example, STP 42, router 60, and media control computers 74 maybe located at a first geographic location while STP 44, router 62, and media control computers 76 are located at a second geographic location. Using multiple geographic locations for the equipments provides communications path for signaling messages which are redundant and diverse so that network communications functions are protected from equipment failure, interoffice facility failures, and central office downing events.

One main advantage of the system described above is that the A-links which were previously established between the STPs in the PSTNs are now replaced by a fewer number of high speed B-links, wherein the potential for service impacting outages due to operational activities of the datacentric network is greatly diminished. The system herein also provides better isolation for the existing SS7 signaling network from the operational activities that will be occurring in the call control computers. With the establishment of the B-links and C-links between the STP pair 42 and 44, the signaling gateway front end will have a higher reliability since the systems are proven for carrier class signaling applications. Further, with the additional STP pair 42 and 44 included in the system, these components may be further configured to perform lower level SS7 protocol processing and encapsulate SS7 ISDN user part (ISUP) messages for transport over an IP network, such that the amount of SS7 protocol processing in the call/medial control computers is minimized. This processing allocation will lead to improved processing performance for call control and thereby, reducing overall network costs. It is envisioned that other lower level functioning processes may be performed by the STP pair 42 and 44.

Yet another feature may be employed with regards to STP pair 42 and 44, is to create specialized protocol or interworking functions on these platforms. Because of the isolation of these STPs from the PSTN, incorporation of the specialized functions will not affect the existing signaling network. For example, a software application which consolidates many point codes that exist on the call/media control computers may be combined into a single virtual point code on the SS7 network which is hosted on the STP pair 42 and 44. It should be further noted that the system described herein is operable with either ATM-based or IP-based data centric networks.

Still further, the use of B-links as a connection to the signaling network provide for a statistical multiplexing effect across multiple point codes, which will improve overall efficiency on the signaling link interfaces. In short, instead of employing many A-links at a low rate of utilization a B-link may be employed which is more highly utilized.

Operations of the system described herein may be better understood by returning to FIGS. 1 and 2 of the present application. If a caller 12 places a telephone call over the PSTN 14, an SSP 30 in the PSTN will receive the call and determine the destination point code for the call. As was described above, this information may be retrieved from the SCP 38 or 40 through the SS7 network. If the ultimate destination of the telephone call is to a point code which requires transmission across the data network 16, the SCP will provide instructions via the STP to route the call to an interim SSP 32 which is in connection with the media gateway 18. As was described above, the call/media computers incorporated in the switch 20 are assigned a point code related to SSP 32. In conjunction, a SS7 message will be routed via STPs 34 and 36, and the STP pair 42 and 44 such that these messages will be received and processed by the call/media computers in switch 20. At this point, the call/media computers will transmit routing instructions via the data network 16 to via gateway 18 for the converting, processing and transmission of the voice call. An additional function provided via the command signals is the multiplexing of signals received at SSP 32 for transmission via the media gateway over the data network 16.

Media gateway 19 which is associated with the destination portion of PSTN 14 also has a interim point code which the SCP has provide to which the packetized message is transmitted to. Upon receipt of the packetized message at media gateway 19, instructions received via the call/media computers will provide for the conversion of the data packets to a voice call and SS7 messages transmitted from the switch 20 through STP pair 42 and 44 will provide a point code associated with the destination. At that point, the voice call is delivered to the destination over the PSTN.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A communications apparatus connectable to a SS7 network for processing voice-to-data signals, comprising:
   a plurality of media gateways, each with its own point code;
   a processing interface that includes at least one pair of signal transfer points (STP), each of which is connectable to at least one other STP within the public switched telephone network (PSTN) via at least one B-link, wherein SS7 signals are transferred therebetween, wherein said at least one B-link is used in place of a larger number of A-Links, and wherein said processing interface is coupled between said plurality of media gateways and said at least one other STP that is configured within the PSTN; and
   at least one switch that aggregates signaling control connectable to the at least one pair of STPs which in turn is connectable to one of the media gateways, wherein the switch controls the processing of the voice information received at the media gateway from the circuit-switched network of the PSTN in response to the SS7 signals received through the at least one pair of STPs, the voice information being switched from the circuit-switched network to a packet-switched network and back to a circuit-switched network.

2. The apparatus of claim 1 wherein a first STP of the at least one pair of STPs is located at a first geographic location and a second STP of the at least one pair of STPs is located at a second geographic and a communications link is provided therebetween.

3. The apparatus of claim 2 wherein a first switch is in communication with the first STP at the first location and a second switch is in communication with the second STP at the second location.

4. The apparatus of claim 3 wherein the first and second switches each include a switching router which are connectable together over a packet transport network.

5. The apparatus of claim 4 wherein the switching routers are configured to transfer encapsulated SS7 messages (MTP, ISUP, and TCAP) between each of the pair of STPs.

6. The apparatus of claim 4 wherein each of the first and second switches includes a plurality of call/media computers configured to process the SS7 signals received by the at least one pair of STPs and to generate control signals which are transmittable over a data network to the media gateway which provides for the voice-to-data processing.

7. The apparatus of claim 6 wherein the plurality of call/media computers are connectable to the at least one pair of STPs and the router through a communications network which comprises a logical A-link.

8. The apparatus of claim 7 wherein the communications network comprises at least one of: a local area network (LAN) and a wide area network (WAN).

9. The apparatus of claim 6 wherein the plurality of call/media computers provide at least one of: class 4 and class 5 switching services.

10. The apparatus of claim 6 wherein the at least one pair of STPs is further configured to perform lower level SS7 protocol processing and encapsulate SS7 ISUP message for transfer over an IP network.

11. A communications apparatus connectable to a SS7 network for processing voice-to-data signals, comprising:
   a plurality of media gateways, each with its own point code;
   a processing interface that includes at least one pair of signal transfer points (STP), each of which is connectable to at least one other STP within the public switched telephone network (PSTN) via at least one B-link, wherein SS7 signals are transferred therebetween, wherein said at least one B-link is used in place of a larger number of A-Links, and wherein said processing interface is coupled between said plurality of media gateways and said at least one other STP that is configured within the PSTN; and
   at least one switch that aggregates signaling control connectable to the at least one pair of STPs which in turn is connectable to one of the media gateways, wherein the switch controls the processing of the voice information received at the media gateway from the PSTN in response to the SS7 signals received through the at least one pair of STPs, for transmission of a telephone call originating in an SSP and terminating in an SSP.

12. A communications apparatus connectable to a SS7 network for processing voice-to-data signals, comprising:
   a plurality of media gateways, each with its own point code;
   a processing interface that includes at least one pair of signal transfer points (STP), each of which is connectable to at least one other STP within the public switched telephone network (PSTN) via at least one B-link, wherein SS7 signals are transferred therebetween, wherein said at least one B-link is used in place of a larger number of A-Links, and wherein said processing interface is coupled between said plurality of media Gateways and said at least one other STP that is configured within the PSTN; and
   at least one switch that aggregates signaling control connectable to the at least one pair of STPs which in turn is connectable to one of the media gateways, wherein the switch controls the processing of the voice information received at the media gateway from the circuit-switched network of the PSTN in response to the SS7 signals received through the at least one pair of STPs, for transmission of a telephone call originating in an SSP and terminating in an SSP, the voice information being switched from the circuit-switched network to a packet-switched network and back to a circuit-switched network.

* * * * *